US012652589B2

(12) United States Patent
Matsuda

(10) Patent No.: US 12,652,589 B2
(45) Date of Patent: Jun. 9, 2026

(54) COMMUNICATION DEVICE, COMMUNICATION METHOD, AND COMMUNICATION SYSTEM

(71) Applicant: CANON KABUSHIKI KAISHA, Tokyo (JP)

(72) Inventor: Araki Matsuda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 302 days.

(21) Appl. No.: 18/469,417

(22) Filed: Sep. 18, 2023

(65) Prior Publication Data

US 2024/0107400 A1 Mar. 28, 2024

(30) Foreign Application Priority Data

Sep. 20, 2022 (JP) ................................. 2022-149542

(51) Int. Cl.
*H04W 36/00* (2009.01)

(52) U.S. Cl.
CPC . *H04W 36/00837* (2018.08); *H04W 36/0055* (2013.01)

(58) Field of Classification Search
CPC ....... H04W 36/00837; H04W 36/0055; H04W 48/16; H04W 84/18
See application file for complete search history.

(56) References Cited

U.S. PATENT DOCUMENTS

| | | | | |
|---|---|---|---|---|
| 6,085,079 | A * | 7/2000 | Tabeta | H04M 1/733 |
| | | | | 455/418 |
| 7,724,249 | B1 * | 5/2010 | Horikawa | G06F 40/174 |
| | | | | 345/531 |
| 9,560,689 | B2 * | 1/2017 | Aoki | H04W 76/14 |
| 10,181,096 | B2 * | 1/2019 | Amano | H04W 36/0011 |
| 10,397,870 | B2 * | 8/2019 | Shimosato | H04B 7/2612 |
| 11,089,481 | B2 * | 8/2021 | Iida | H04W 12/50 |
| 2013/0260682 | A1 * | 10/2013 | Suzuki | H04W 76/14 |
| | | | | 455/41.1 |
| 2013/0260683 | A1 * | 10/2013 | Suzuki | G06F 3/1236 |
| | | | | 455/41.1 |
| 2014/0293945 | A1 * | 10/2014 | Kato | H04W 72/0453 |
| | | | | 370/329 |
| 2015/0023242 | A1 * | 1/2015 | Sato | H04L 67/51 |
| | | | | 370/312 |
| 2015/0365996 | A1 * | 12/2015 | Lee | H04L 41/5009 |
| | | | | 370/332 |

(Continued)

FOREIGN PATENT DOCUMENTS

JP 2019087926 A 6/2019

*Primary Examiner* — Dominic E Rego
(74) *Attorney, Agent, or Firm* — Canon U.S.A., Inc. IP Division

(57) ABSTRACT

A communication device comprises a first communication circuit and a second communication circuit that is able to perform higher speed communication than the first communication circuit, wherein in order to make the second communication circuit connectable to an external device, communication with the external device using the first communication circuit is needed. When disconnecting a connection established between the second communication circuit and the external device, the communication device requests the external device to maintain, for a predetermined time, a state in which the second communication circuit is connectable, according to a reason of disconnecting the connection.

8 Claims, 5 Drawing Sheets

(56) References Cited

U.S. PATENT DOCUMENTS

| | | | | | |
|---|---|---|---|---|---|
| 2016/0350041 | A1* | 12/2016 | Katano | ............... | H04L 67/025 |
| 2017/0332301 | A1* | 11/2017 | Horn | ................... | H04W 76/15 |
| 2018/0317159 | A1* | 11/2018 | Frenger | ............... | H04L 5/0096 |
| 2021/0239983 | A1* | 8/2021 | Song | ................... | A63F 13/213 |
| 2023/0189120 | A1* | 6/2023 | Wirth | ................... | H04W 88/10 |
| | | | | | 455/435.3 |

* cited by examiner

F I G. 2
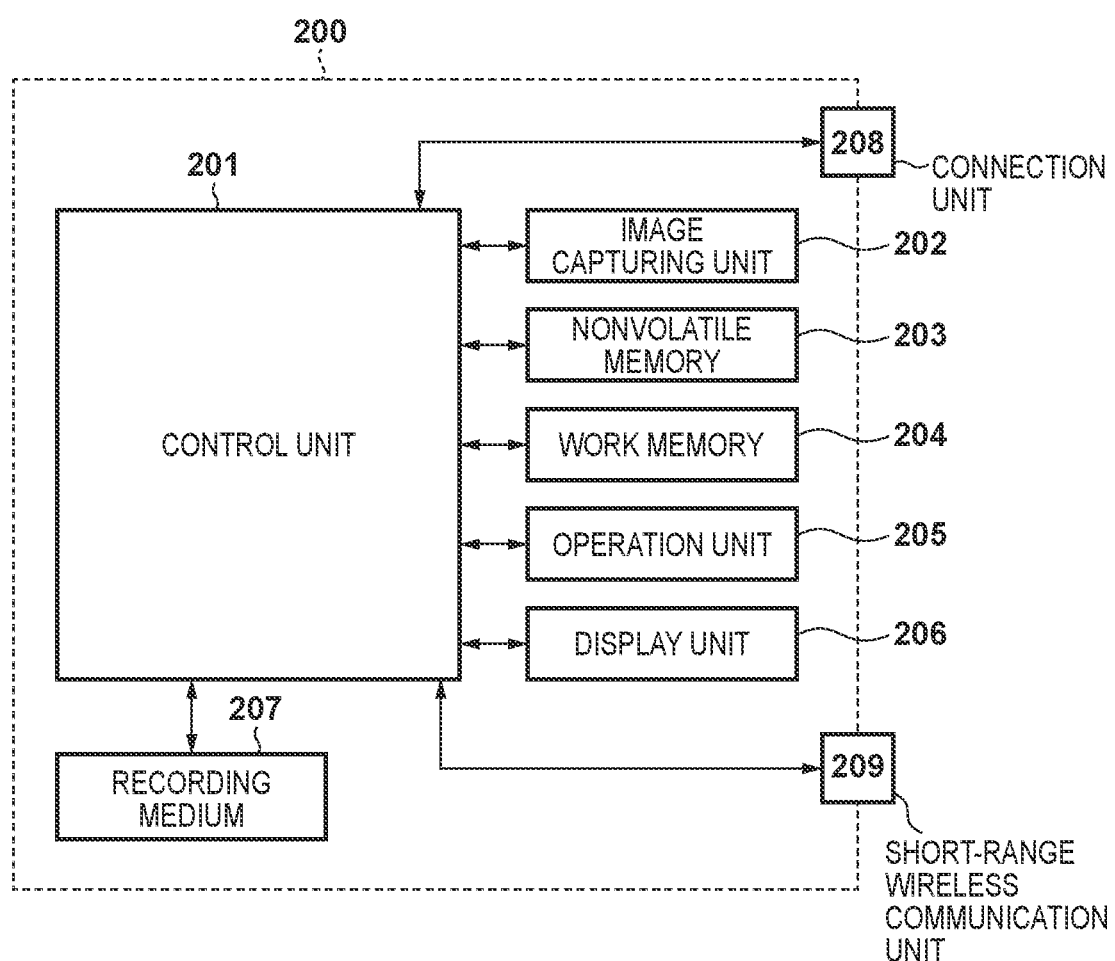

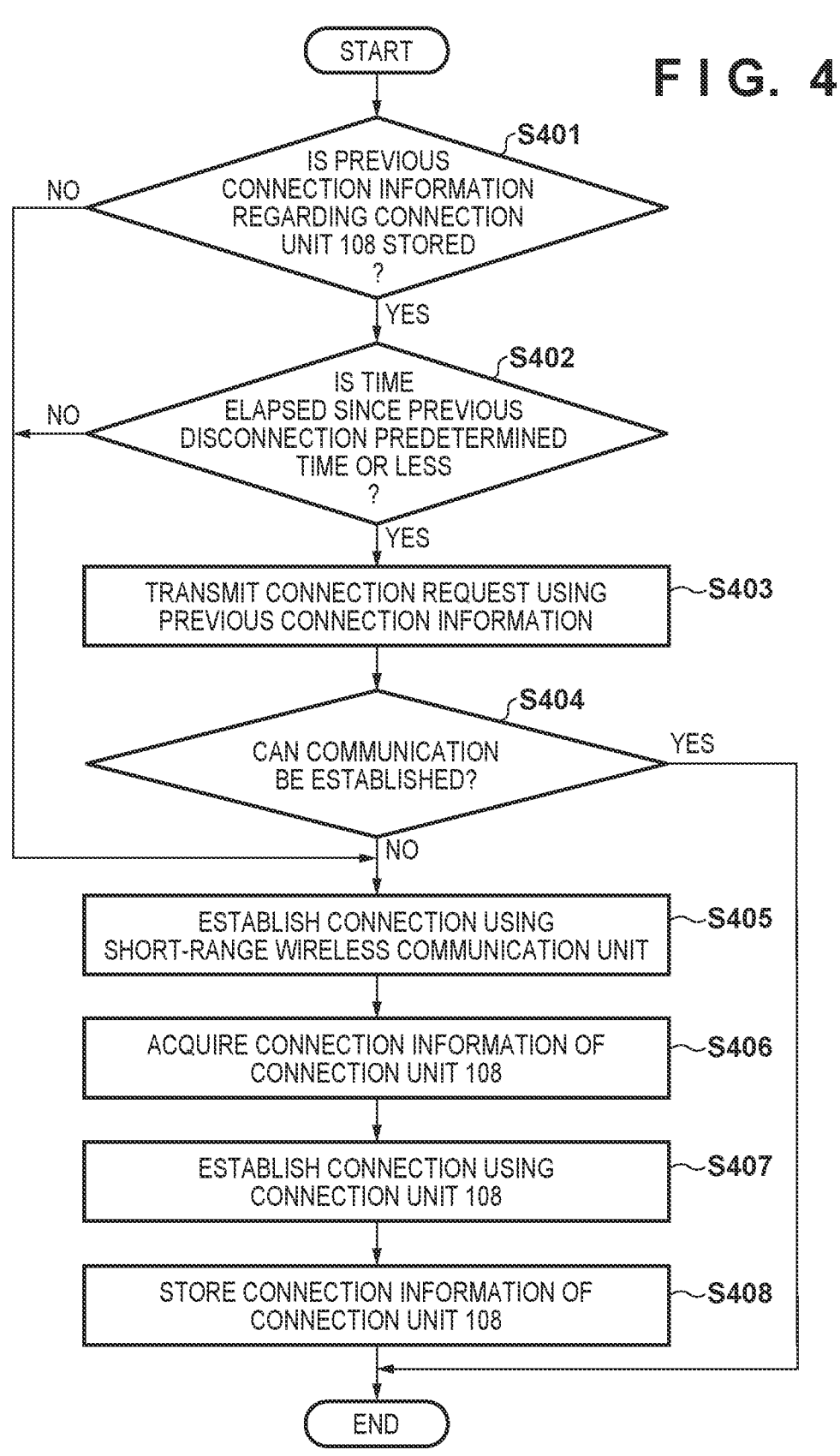
F I G. 4

COMMUNICATION DEVICE, COMMUNICATION METHOD, AND COMMUNICATION SYSTEM

BACKGROUND

Field

The present disclosure relates to a communication device, a communication method, and a communication system, and specifically relates to a communication technique for using a plurality of communication methods.

Description of the Related Art

Previously, communication apparatuses have been known which include a plurality of communication units corresponding to a plurality of different wireless communication methods having different in characteristics (Japanese Patent Laid-Open No. 2019-87926). When such communication apparatuses perform communication to each other, if all of the communication units operate continuously, the power consumption increases. On the other hand, if only a communication unit to be used operates, switching of used communication unit causes a waiting time until the switched communication unit can start communication.

Therefore, in Japanese Patent Laid-Open No. 2019-87926, by causing a second communication unit whose power consumption is large, out of first and second communication units, to operate in an energy saving mode, the power consumption is reduced while the two communication units are caused to operate continuously.

In Japanese Patent Laid-Open No. 2019-87926, by transmitting a request signal through the first communication unit, the operation mode of the second communication unit is switched from the energy saving mode to a normal mode, and communication by the second communication unit is executed. The second communication unit can only receive data intermittently in the energy saving mode. Therefore, communication for returning the second communication unit to the normal mode needs to be performed by the first communication unit.

SUMMARY

The present disclosure provides, according to some embodiments, a communication device that can perform communication using, selectively, a plurality of communication means, and can reduce time until communication becomes possible.

According to one embodiment of the present disclosure, there is provided a communication device comprising: a first communication circuit; a second communication circuit that is able to perform higher speed communication than the first communication circuit; and one or more processors that execute a program stored in a memory and thereby function as a control unit configured to control operations of the first communication circuit and the second communication circuit, wherein, in order to make the second communication circuit connectable to an external device, communication with the external device using the first communication circuit is needed, and the control unit, when disconnecting a connection established between the second communication circuit and the external device, requests the external device to maintain, for a predetermined time, a state in which the second communication circuit is connectable, according to a reason of disconnecting the connection.

According to another embodiment of the present disclosure, there is provided a communication device comprising: a first communication circuit; a second communication circuit that is able to perform higher speed communication than the first communication circuit; and one or more processors that execute a program stored in a memory and thereby function as: a control unit configured to control operations of the first communication circuit and the second communication circuit, wherein the control unit upon receiving a request from an external device through the first communication circuit, causes the second communication circuit to operate, and upon receiving a disconnection request of a connection between the second communication circuit and the external device from the external device through the second communication circuit, after maintaining the operation of the second communication circuit for a first predetermined time, causes the second communication circuit to end operation.

According to a further embodiment of the present disclosure, there is provided a communication system comprising: a first communication device and a second communication device, wherein: the first communication device comprising: a first communication circuit; a second communication circuit that is able to perform higher speed communication than the first communication circuit; and one or more processors that execute a program stored in a memory and thereby function as a control unit configured to control operations of the first communication circuit and the second communication circuit, wherein, in order to make the second communication circuit connectable to the second communication device, communication with the second communication device using the first communication circuit is needed, and the control unit, when disconnecting a connection established between the second communication circuit and the second communication device, requests the second communication device to maintain, for a predetermined time, a state in which the second communication circuit is connectable, according to a reason of disconnecting the connection, and the second communication device comprising: a third communication circuit; a fourth communication circuit that is able to perform higher speed communication than the third communication circuit; and one or more processors that execute a program stored in a memory and thereby function as: a control unit configured to control operations of the third communication circuit and the fourth communication circuit, wherein the control unit upon receiving a request from the first communication device through the third communication circuit, causes the fourth communication circuit to operate, and upon receiving a disconnection request of a connection between the fourth communication circuit and the first communication device from the first communication device through the fourth communication circuit, after maintaining the operation of the fourth communication circuit for a first predetermined time, causes the fourth communication circuit to end operation.

According to another embodiment of the present disclosure, there is provided a communication method to be executed by a communication device including: a first communication circuit; and a second communication circuit that is able to perform higher speed communication than the first communication circuit, communication with the external device using the first communication circuit being needed in order to make the second communication circuit connectable to an external device, the communication method comprising requesting, when disconnecting a connection established between the second communication circuit and the external device, the external device to maintain a state in which the second communication circuit is connectable for a predetermined time, according to a reason of disconnecting the connection.

According to a further embodiment of the present disclosure, there is provided a communication method to be executed by a communication device including: a first communication circuit; and a second communication circuit that is able to perform higher speed communication than the first communication circuit, the communication method comprising: causing, upon receiving a request from an external device through the first communication circuit, the second communication circuit to operate; causing, upon receiving a disconnection request of a connection between the second communication circuit and the external device from the external device through the second communication circuit, after maintaining the operation of the second communication circuit for a first predetermined time, the second communication circuit to end operation.

According to another embodiment of the present disclosure, there is provided a non-transitory computer-readable medium that stores a program which, when executed by a computer of a communication device that includes a first communication circuit and a second communication circuit that is able to perform higher speed communication than the first communication circuit, wherein communication with the external device using the first communication circuit being needed in order to make the second communication circuit connectable to an external device, causes the computer to perform a communication method comprising: requesting, when disconnecting a connection established between the second communication circuit and the external device, the external device to maintain a state in which the second communication circuit is connectable for a predetermined time, according to a reason of disconnecting the connection.

According to a further embodiment of the present disclosure, there is provided a non-transitory computer-readable medium that stores a program which, when executed by a computer of a communication device that includes a first communication circuit and a second communication circuit that is able to perform higher speed communication than the first communication circuit, causes the computer to perform a communication method comprising: causing, upon receiving a request from an external device through the first communication circuit, the second communication circuit to operate; causing, upon receiving a disconnection request of a connection between the second communication circuit and the external device from the external device through the second communication circuit, after maintaining the operation of the second communication circuit for a first predetermined time, the second communication circuit to end operation.

Further features of the present disclosure will become apparent from the following description of exemplary embodiments (with reference to the attached drawings).

BRIEF DESCRIPTION OF THE DRAWINGS

FIG. 2 is a block diagram illustrating an exemplary functional configuration of a digital camera serving as an example of the external device of the communication device in FIG. 1.

4

Figure 3:
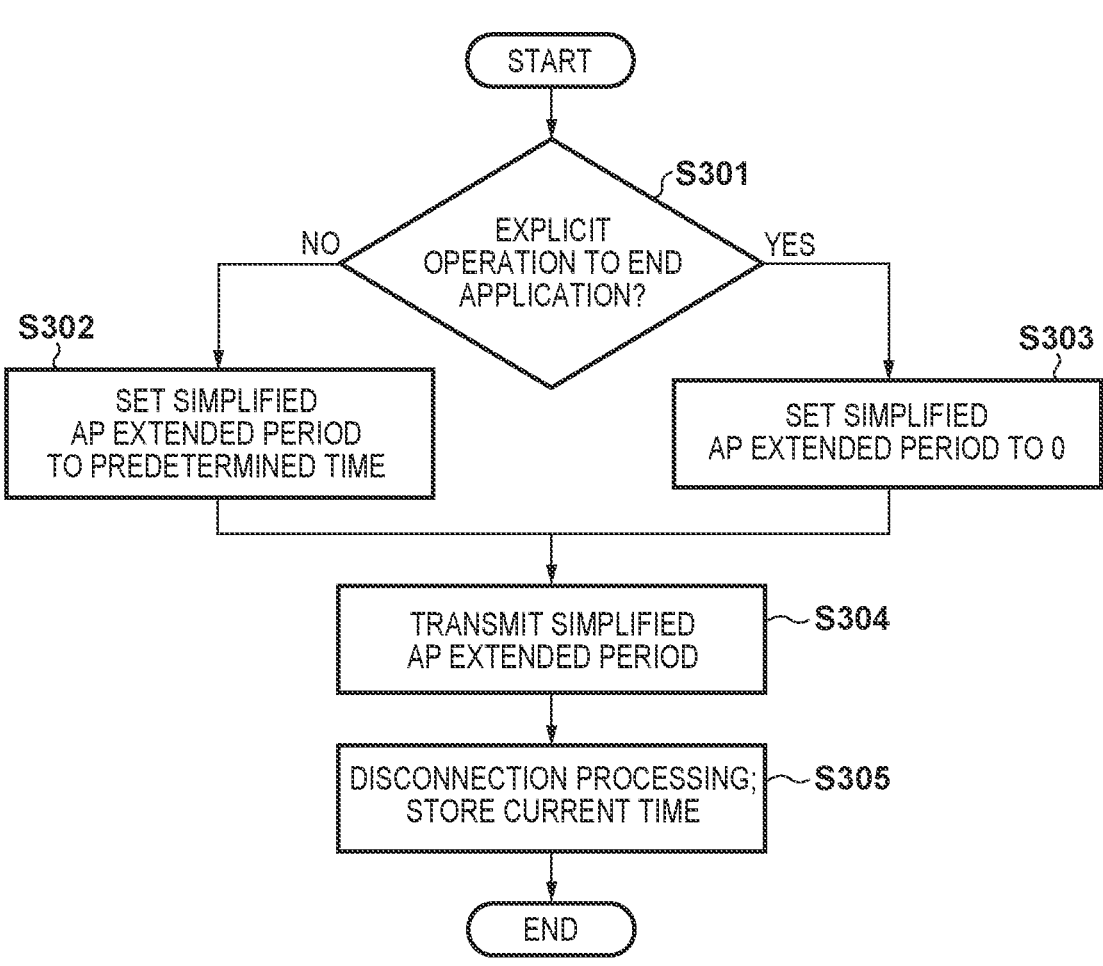

FIG. 3 is a flowchart regarding the operation of the smartphone according to the embodiment.

FIG. 4 is a flowchart regarding the operation of the smartphone according to the embodiment.

Figure 5:
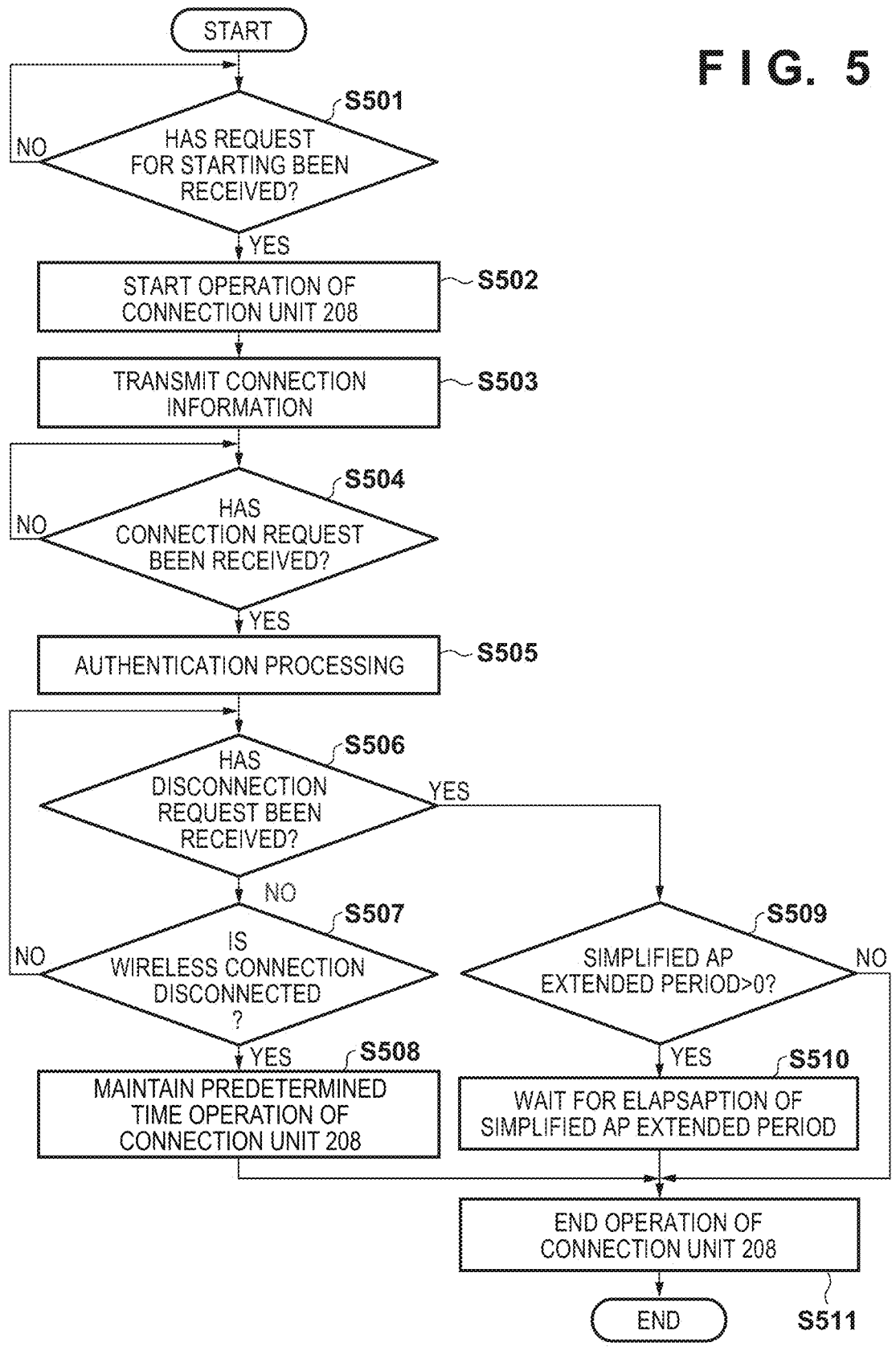

FIG. 5 is a flowchart regarding the operation of the digital camera according to the embodiment.

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made to embodiments that require all such features, and multiple such features may be combined as appropriate in different embodiments. Furthermore, in the attached drawings, the same reference numerals are given to the same or similar configurations, and redundant description thereof is omitted.

Note that, in the following embodiment, a case will be described in which the present invention is implemented by a smartphone and a digital camera. However, embodiments of the present disclosure can be implemented by any electronic devices (in particular, battery driven and/or portable electronic devices) that support a plurality of wireless communication methods. Such electronic devices include a computer apparatus (personal computer, tablet computer, media player, PDA, etc.), a game machine, a wearable terminal (smart watch, activity tracker, etc.), and the like. These are merely illustrative, and in other embodiments, features of the present disclosure can be implemented by other electronic devices.

Figure 1:
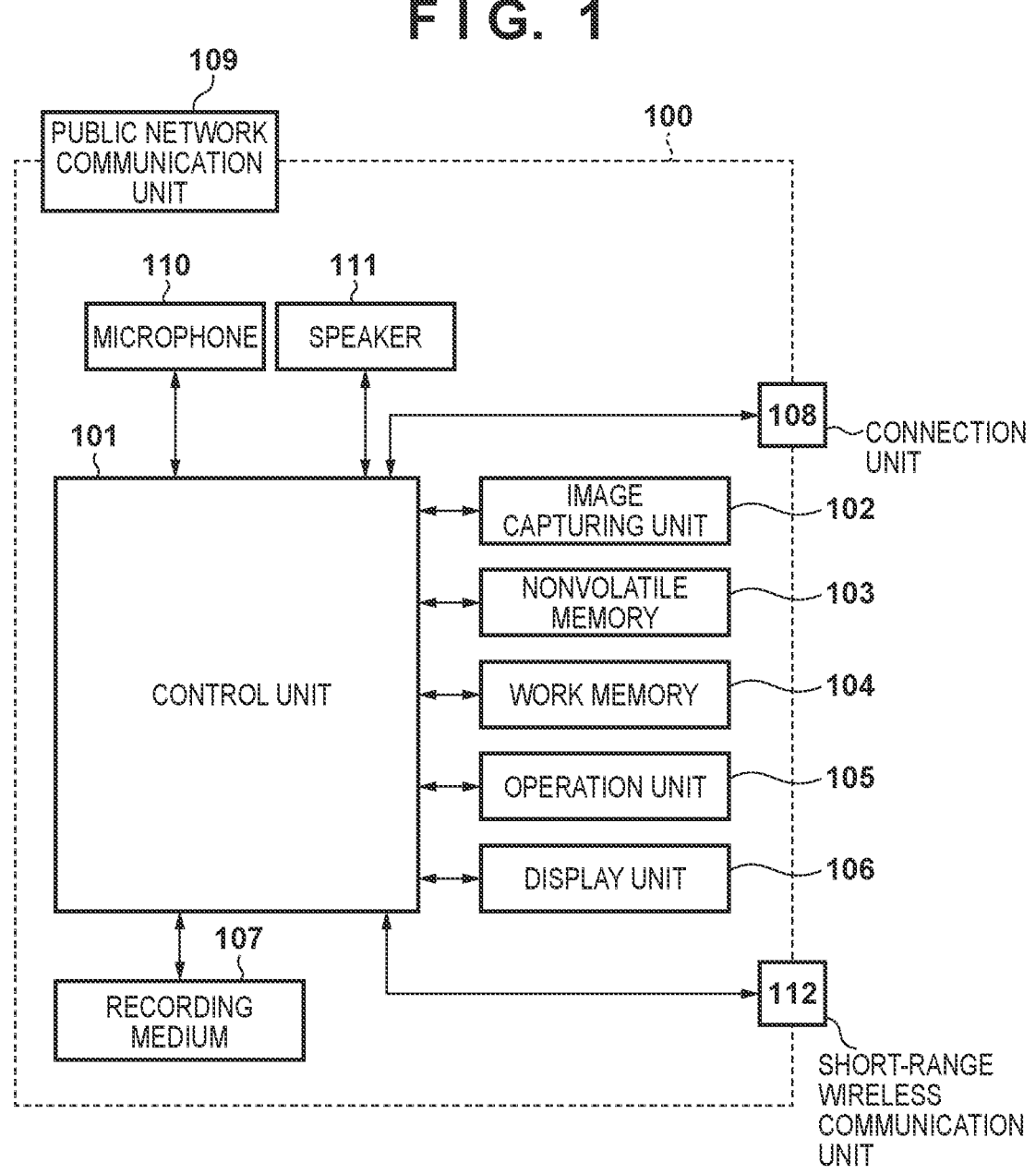
FIG. 1 is a block diagram illustrating an exemplary functional configuration of a smartphone serving as an example of the communication device according to an embodiment.

FIG. 1 is a block diagram illustrating an exemplary functional configuration of a smartphone 100 serving as an example of the communication device according to the embodiment.

A control unit 101 includes at least one processor (hereinafter, referred to as a "CPU") that can execute programs, loads a program stored in a nonvolatile memory 103, for example, to a work memory 104, and executes the program. The control unit 101 controls operations of the functional blocks and realizes the functions of a smartphone 100, by executing programs.

The nonvolatile memory 103, which may be rewritable, stores programs (operating system (OS), application, etc.) that can be executed by the CPU of the control unit 101, set values of the smartphone 100 and applications, user data, and the like. Also, as described later, the smartphone 100 stores, in the nonvolatile memory 103, information regarding an external device with which communication has been performed, and information needed for restarting communication with an external device with which communication has been performed.

Note that it is assumed that the later-described communication processing of the smartphone 100 is implemented as a function of an application stored in the nonvolatile memory 103. Note that the application need not include all of the programs for realizing the functions thereof, and can use the functions provided by the OS, as needed. For example, basic functions regarding wireless communication with an external device conforming to a specific wireless communication standard can be provided by the OS, such as confirming whether or not an external device is present, and establishing and disconnecting a wireless connection (link) with an external device.

A work memory 104 is a volatile memory, for example, and is used to load a program to be executed by the CPU of the control unit 101, and to save needed values while a program is being executed. Also, a portion of the work memory 104 may be used as a display memory of a display unit 106.

An image capturing unit 102 is a camera unit including an imaging optical system, an image sensor, and the like. The image capturing unit 102 performs shooting according to the control of the control unit 101, and stores the obtained image data in the work memory 104. The control unit 101 generates an image data file by applying predetermined image processing on the image data. The control unit 101 stores the image data file in a recording medium 107, for example.

Input devices provided in the smartphone 100 are collectively referred to as an operation unit 105. The operation unit 105 may include a touch panel provided in the display unit 106, a power switch, a sound volume adjustment button, and the like, but there is no limitation thereto. Upon detecting an operation on the operation unit 105, the control unit 101 executes an operation according to the detected operation.

The display unit 106 displays a screen provided by the OS and an application. Note that an external display device may be connectable to the smartphone 100.

The recording medium 107 is provided separately from the nonvolatile memory 103, and may be a semiconductor memory card, for example. The recording medium 107 is used as a recording destination of an image data file generated by the control unit 101, and data and the like that are downloaded by a user, for example. Note that the recording medium 107 may also be used as a portion of the nonvolatile memory 103 (in order to expand the capacity of the nonvolatile memory 103).

A connection unit 108 (second communication circuit) is a communication interface. The connection unit 108 executes communication, with an external device, that is conforming to at least one communication standard including a wireless communication standard, out of known wired and wireless communication standards. The connection unit 108 includes circuits (antenna, connector, transmitter/receiver, etc.) in accordance with the conforming communication standard.

A short-range wireless communication unit 112 (first communication circuit) is also a communication interface. The short-range wireless communication unit 112 executes communication, with an external device, that is conforming to at least one known short-range wireless communication standard. The short-range wireless communication unit 112 includes circuits (antenna, connector, transmitter/receiver, etc.) in accordance with the conforming communication standard.

Here, it is assumed that the connection unit 108 and the short-range wireless communication unit 112 are conforming to wireless communication standards that are different to each other, for the sake of description. Also, it is assumed that the connection unit 108 conforms to a communication standard in which the specified communication range is wider, and the communication speed is higher than those of the short-range wireless communication unit 112, and the power consumption needed for operations is larger than that of the short-range wireless communication unit 112. It is also assumed that communication with an external device using the short-range wireless communication unit 112 is needed in order for the connection unit 108 to connect to the external device.

The control unit 101 causes the short-range wireless communication unit 112 to preferentially operate relative to the connection unit 108, in order to reduce the power consumption of the smartphone 100. The control unit 101 causes, in principle, the short-range wireless communication unit 112 to execute detecting an external device and communicating with the detected external device, for example. The control unit 101 causes the connection unit 108 to operate, and communicates with an external device through the connection unit 108, only when a predetermined specific condition is satisfied, such as a case where high-speed communication is needed.

Also, the control unit 101 can acquire information needed for communication with an external device using the connection unit 108 (e.g., identification information, password or encryption key, address information) from the external device through the short-range wireless communication unit 112. Switching of the communication interface used for communication with the same external device between the short-range wireless communication unit 112 and the connection unit 108 is referred to as "handover", here.

It is assumed that the connection unit 108 is a wireless communication interface conforming to the wireless LAN (IEEE 802.11 series) standard below, as an example. Also, it is assumed that the short-range wireless communication unit 112 is a wireless communication interface conforming to the Bluetooth (registered trademark) ver. 4.0 or later, specifically conforming to the Bluetooth Low Energy (BLE). However, the combination of communication standards that the connection unit 108 and the short-range wireless communication unit 112 are conforming to may also be another combination, as long as the above-described relationship is satisfied.

A public network communication unit 109 is a communication interface with a mobile communication network, and conforms to at least one of the communication standards (3G, 4G, 5G, etc.) defined by the 3rd Generation Partnership Project (3GPP), for example.

Note that the connection unit 108, short-range wireless communication unit 112, and public network communication unit 109 may share some of the circuits.

A microphone 110 is used for talking and inputting a voice command. The microphone 110 as an input device of a voice command is included in the operation unit 105.

A speaker 111 is used for reproducing talking and voice.

FIG. 2 is a block diagram illustrating an exemplary functional configuration of a digital camera 200 serving as an example of the external device that can communicated with the smartphone 100. The external device may be any portable or battery-driven electronic device that can communicate with each of the connection unit 108 and the short-range wireless communication unit 112 of the smartphone 100.

A control unit 201 includes at least one processor (hereinafter, referred to as a "CPU") that can execute programs, loads a program stored in a nonvolatile memory 203, for example, to a work memory 204, and executes the program. The control unit 201 controls operations of the functional blocks and realizes the functions of a digital camera 200, by executing programs.

The nonvolatile memory 203, which may be rewritable, stores programs that the CPU of the control unit 201 can execute, set values of the digital camera 200, GUI data, and the like. The nonvolatile memory 203 also stores information regarding an external device with which communication has been performed.

Note that it is assumed that the later-described communication processing of the digital camera 200 is implemented as a function of a program stored in the nonvolatile memory 203.

A work memory 204 is a volatile memory, for example, and is used to load a program to be executed by the CPU of the control unit 201, and to save needed values while a program is being executed. Also, a portion of the work memory 204 may be used as a display memory of a display unit 206.

An image capturing unit 202 is a camera unit including an imaging optical system, an image sensor, and the like. The image capturing unit 202 performs shooting according to the control of the control unit 201, and stores the obtained image data in the work memory 204. The control unit 201 generates an image data file by applying predetermined image processing on the image data. The control unit 201 stores the image data file in a recording medium 207, for example. Also, the control unit 201 generates display image data by applying predetermined image processing on image data. The control unit 201 stores the display image data in a video memory area of the work memory 204, generates a composite image indicating information such as current set values, and causes the display unit 206 to display the composite image.

The display unit 206 can be caused to function as an electrical view finder (EVF) by successively shooting a moving image using the image capturing unit 202 and immediately displaying the shot moving image in the display unit 206. The moving image to be displayed in order to cause the display unit 206 to function as the EVF is referred to as a "live view image".

Input devices provided in the digital camera 200 are collectively referred to as an operation unit 205. The operation unit 205 may include a touch panel provided in the display unit 206, a power switch, a shutter button, a moving image shooting button, arrow keys, a setup button, a menu button, and the like, but there is no limitation thereto. Upon detecting an operation on the operation unit 205, the control unit 201 executes an operation according to the detected operation.

The display unit 206 is used to display an image shot by the image capturing unit 202, an image recorded in the recording medium 207, a menu screen, and the like. Note that an external display device may be connectable to the digital camera 200.

The recording medium 207 is provided separately from the nonvolatile memory 203, and may be a semiconductor memory card, for example. The recording medium 207 is used as a recording destination of an image data file generated by the control unit 201, for example.

A connection unit 208 is a communication interface. The connection unit 208 executes communication, with an external device, that is conforming to at least one communication standard including a wireless communication standard, out of known wired and wireless communication standards. The connection unit 208 includes circuits (antenna, connector, transmitter/receiver, etc.) in accordance with the conforming communication standard.

A short-range wireless communication unit 209 is also a communication interface. The short-range wireless communication unit 209 executes communication, with an external device, that is conforming to at least one known short-range wireless communication standard. The short-range wireless communication unit 209 includes circuits (antenna, connector, transmitter/receiver, etc.) in accordance with the conforming communication standard.

Here, it is assumed that the connection unit 208 and the short-range wireless communication unit 209 are conforming to wireless communication standards that are different to each other, for the sake of description. Also, it is assumed that the connection unit 208 conforms to a communication standard in which the specified communication range is wider, and the communication speed is higher than those of the short-range wireless communication unit 209, and the power consumption needed for operations is larger than that of the short-range wireless communication unit 209. The combination of communication standards that the connection unit 208 and the short-range wireless communication unit 209 are conforming to is not specifically limited, as long as the above-described relationship is satisfied.

In the present embodiment, the digital camera 200 communicates with the connection unit 108 and short-range wireless communication unit 112 of the smartphone 100. Therefore, it is assumed that the connection unit 208 is a wireless communication interface conforming to the wireless LAN (IEEE 802.11 series) standard, and the short-range wireless communication unit 209 is a wireless communication interface conforming to the Bluetooth Low Energy (BLE).

Note that the connection unit 208 and the short-range wireless communication unit 209 may share some of the circuits.

Also, the connection unit 208 functions as an access point (AP) in order to communicate with the connection unit 108 in an infrastructure mode. That is, the connection unit 208 has a function of forming a network to which the smartphone 100 can connect. Note that it is assumed that the connection unit 208 functions as a simplified AP that does not have a gateway function of transferring data received from an external device that has connected to the network formed by the connection unit 208 to another network.

The control unit 201 causes the short-range wireless communication unit 209 to preferentially operate relative to the connection unit 208, in order to reduce the power consumption of the digital camera 200. The control unit 201 causes, in principle, the short-range wireless communication unit 209 to execute detecting an external device and communicating with the detected external device, for example. The control unit 201 causes the connection unit 208 to operate and communicate with an external device through the connection unit 208, only when a predetermined specific condition is satisfied, such as a case where a request has been received from the external device through the short-range wireless communication unit 112.

Next, the operation of the smartphone 100 relating to controlling communication with an external device (digital camera 200) will be described.

First, the control unit 101 executes, periodically for example, in a state in which the connection unit 108 does not operate, an operation to detect an external device using the short-range wireless communication unit 112. Note that the operation to detect an external device may differ depending on the standard that the short-range wireless communication unit 112 conforms to.

Upon the short-range wireless communication unit 112 detecting an external device, the control unit 101 transmits a connection request to the external device from the short-range wireless communication unit 112, and executes a procedure for establishing wireless connection. This procedure may differ depending on the communication standard. Also, if there is a procedure needed to be executed before establishing wireless connection, the procedure is also executed. For example, when the short-range wireless communication unit 112 performs communication conforming to the BLE, if pairing is not performed with the external device, the procedure needed for establishing wireless connection is executed after pairing has been executed. On the other hand, if pairing has been performed with the detected external device, the control unit 101 causes the short-range wireless communication unit 112 to transmit a connection request to the external device using pairing information stored in the nonvolatile memory 103.

Upon the wireless connection being established between the short-range wireless communication units 112 and 209, communication can be performed between the smartphone 100 and the digital camera 200. For example, an application that runs in the smartphone 100 can communicate with the digital camera 200 according to a user instruction or an occurrence of a predetermined event.

When using communication whose speed is higher than the communication performed by the short-range wireless communication unit 112, the control unit 101 executes a procedure for establishing wireless connection between the connection units 108 and 208. The case where the communication whose speed is higher than the communication performed by the short-range wireless communication unit 112 is used can be determined in advance. The case may include a case where image data is transferred from the digital camera 200 to the smartphone 100, a case of receiving an instruction from a user, and the like.

The control unit 101 transmits a request for starting the connection unit 208 (simplified AP) to the digital camera 200 through the short-range wireless communication unit 112. Upon receiving the request for starting the connection unit 208, the control unit 201 of the digital camera 200 starts the connection unit 208. Accordingly, the connection unit 208 serving as a simplified AP forms a network. Also, the control unit 201 transmits information needed for connecting to the network formed by the connection unit 208 to the smartphone 100 through the short-range wireless communication unit 209.

Upon receiving information needed for the connection unit 108 to connect to the network formed by the connection unit 208 of the digital camera 200 from the digital camera 200 through the short-range wireless communication unit 112, the control unit 101 stores the information in the nonvolatile memory 103. Here, it is assumed that an SSID, a password (encryption key), and an IP address are received, as the information for connecting to the network formed by the connection unit 208. However, this information may differ depending on the standard that the connection units 108 and 208 conform to.

The control unit 101 starts the connection unit 108, and acquires information regarding networks that are present in the surrounding area. Also, if the SSID included in the information received from the digital camera 200 can be confirmed, a connection request is transmitted from the connection unit 108. Note that the configuration may be such that a connection request is transmitted from the connection unit 108 after a certain time has elapsed since the request for starting the connection unit 208 has been transmitted to the digital camera 200.

In authentication processing thereafter, the control unit 101 uses the password received from the digital camera 200. Upon succeeding the authentication, wireless connection between the connection units 108 and 208 is established. Accordingly, high-speed communication can be performed between the connection units 108 and 208, the communication speed thereof being higher than that of communication between the short-range wireless communication units 112 and 209.

The operation of the smartphone 100 when ending the communication performed by the connection unit 108, in a state in which the wireless connection between the connection units 108 and 208 is established as described above, will be described using the flowchart shown in FIG. 3. This operation can be executed when the control unit 101 detects that a cooperative application that uses the wireless connection between the connection units 108 and 208 has transitioned from an active state.

In step S301, the control unit 101 finds out the reason why the cooperative application has transitioned from an active state to an inactive state. Specifically, the control unit 101 determines whether or not the reason why the cooperative application has transitioned from an active state to an inactive state is an explicit operation to end the application. The control unit 101 executes step S303 if it is determined that the reason why the cooperative application has transitioned from an active state to an inactive state is an explicit operation to end the application, and executes step S302 if not. The event that the cooperative application has transitioned from an active state to an inactive state is an example of the event that requires disconnection of wireless connection between the connection units 108 and 208. Therefore, the determination in step S301 may be determining whether or not, when an event that requires disconnection of wireless connection between the connection units 108 and 208 has occurred, it is conceivable that the event has occurred due to an explicit user intention.

The reasons why the cooperative application has transitioned from an active state to an inactive state may include following operations.

(1) Operation that is defined, in the OS in which the cooperative application is operating, as a quit operation of the application.

(2) Operation that causes the cooperative application to transition from an active state to an inactive state.

(3) Quit operation (such as an operation to select "end" from a menu screen) defined by the cooperative application.

Note that the operations (1) to (3) are illustrative, and may change depending on the OS and application.

The operation to cause transition from an active state to an inactive state may be an operation to move an application window from the topmost window (operation to cause the application to transition from a foreground to a background), for example.

In step S301, the control unit 101 determines that the operations (1) and (3) are explicit quit operations of the application, for example. On the other hand, the control unit 101 does not determine that the operation (2) is an explicit quit operation, for example. This is because, in the case of the operation (2), the application may be returned to an active state again.

Note that it is assumed that, even when it is determined to be an explicit quit operation in step S301, the cooperative application does not end, and the wireless connection between the connection units 108 and 208 is not disconnected. The control unit 101 maintains the wireless connection between the connection units 108 and 208 until a disconnection of wireless connection is requested in later-described step S305.

In step S302, the control unit 101 determines the simplified AP extended period to be a predetermined time (e.g., 30 seconds) that is not 0, and thereafter executes step S304.

In step S303, the control unit 101 sets the simplified AP extended period to 0, and thereafter executes step S304.

When the cooperative application transitions from an active state not by the explicit quit operation, the cooperative application may be temporarily not in an active state, and my return to an active state in a short period of time. In this case, the control unit 101 determines the simplified AP extended period that is not 0, in order to request a partner device (digital camera 200) of the wireless connection to maintain a connectable state for a predetermined time. On the other hand, when an explicit quit operation has been performed on the cooperative application, it is conceivable that the user has a clear intention to end cooperation with the digital camera 200. Therefore, the control unit 101 sets the simplified AP extended period to 0, and prioritizes reduction of the power consumption due to operation of the connection unit 208 than the reduction in reconnection time.

In step S304, the control unit 101 transmits the simplified AP extended period determined in step S302 or S303 to the digital camera 200 from the connection unit 108. The control unit 201 of the digital camera 200 stores the simplified AP extended period received by the connection unit 208 in the work memory 104, for example.

In step S305, the control unit 101 transmits a request to disconnect wireless connection with the connection unit 208 to the digital camera 200 from the connection unit 108. Also, the control unit 101 disconnects the wireless connection by causing the connection unit 108 to stop operating, for example. Moreover, the control unit 101 acquires a current time from a clock circuit, and stores the current time in the work memory 104. In addition, if it is determined, in step S301, that the operation with which disconnection of wireless connection between the connection units 108 and 208 is needed is an explicit operation to end the application, the control unit 101 ends the cooperative application.

Note that when the OS of the smartphone 100 has a function of automatically connecting to a past-connected network, the control unit 101 removes the network generated by the digital camera 200 (connection unit 208) from the targets of automatic reconnection. Accordingly, applications other than the cooperative application that uses the digital camera 200 are not allowed to connect to the network generated by the digital camera 200. Note that the operation to remove the network generated by the digital camera 200 from the targets of automatic reconnection can be executed at any timing after first connection to the network generated by the digital camera 200 is made.

Upon the connection unit 208 receiving the request to disconnect wireless connection, the control unit 201 finds out whether the simplified AP extended period that is not 0 is stored in the work memory 204. Then, if the simplified AP extended period is set, the control unit 201 maintains the operation of the connection unit 208 until the simplified AP extended period has elapsed after the disconnection request was received. Accordingly, the connection unit 208 can maintain a state of being connectable from the connection unit 108 for a certain period of time after receiving the disconnection request from the smartphone 100.

Next, the operation when an operation to transition (return) the cooperative application from a background to a foreground has been detected in smartphone 100 will be described using the flowchart in FIG. 4.

In step S401, the control unit 101 determines whether or not previous connection information regarding the connection unit 108 is stored in the work memory 104 (or, nonvolatile memory 103). The previous connection information includes the S SID, password (encryption key), IP address that the connection unit 108 used when communicated with the external device previously. The control unit 101 executes step S402 if the previous connection information is stored, and executes step S405 if not.

In step S402, control unit 101 determines whether or not the time elapsed since the connection unit 108 has disconnected wireless connection immediately before is a predetermined time or less. The predetermined time used here is the simplified AP extended period set in step S302. The control unit 101 can perform determination based on the time stored in step S305 and the current time acquired from the clock circuit. The control unit 101 executes step S403 if it is determined that the elapsed time is the predetermined time or less, and executes step S405 if not (if elapsed time>predetermined time).

In step S403, the control unit 101 transmits a connection request from the connection unit 108 using the previous connection information stored in the nonvolatile memory 103.

In step S404, the control unit 101 determines whether or not wireless connection with the digital camera 200 through the connection unit 108 has been established. The control unit 101 ends the processing shown in FIG. 4 if it is determined that the wireless connection has been established. The control unit 101 executes step S405 if it is not determined that the wireless connection has been established.

Steps S405 to S407 are processing for executing reconnection of the connection unit 108 through communication using the short-range wireless communication unit 112.

In step S405, the control unit 101 establishes wireless connection by the short-range wireless communication unit 112 with the digital camera 200. Note that when the wireless connection by the short-range wireless communication unit 112 is maintained, step S405 may not be executed.

In step S406, the control unit 101 transmits a request for starting a simplified AP to the digital camera 200 through the short-range wireless communication unit 112. Upon receiving the request for starting a simplified AP (connection unit 208), the control unit 201 of the digital camera 200 starts the connection unit 208. Accordingly, the connection unit 208 generates a network functioning as a simplified AP. Also, the control unit 201 transmits information needed for connecting to the network generated by the connection unit 208 (connection information) to the smartphone 100 through the short-range wireless communication unit 209.

In step S407, the control unit 101 transmits a connection request from the connection unit 108 using the connection information acquired from the digital camera 200. Thereafter, authentication processing is executed, and thereafter wireless connection between the connection units 108 and 208 is established.

Note that, after transmitting the request for starting the connection unit 208 to the digital camera 200 in step S406, the connection request may also be transmitted using the connection information that is previously used and is stored in the nonvolatile memory 103 without waiting for receiving the connection information.

In step S408, the control unit 101 stores the connection information received in step S406 in the nonvolatile memory 103. Note that the storage of the connection information may be executed in step S406.

In the present embodiment, when the wireless connection is disconnected caused by the change in state of a cooperative application that uses wireless communication from an active state, the cause of the state change is found out. Then, if the state change is not caused by an explicit quit operation of the application, the partner device is requested to maintain the connectable state for a certain period of time. Therefore, when the application is returned to an active state after a short period of time, the time needed to re-establish wireless connection with the partner device can be reduced.

Operation control of the connection unit 208 in the digital camera 200 will be described using the flowchart in FIG. 5. Here, it is assumed that wireless connection with the partner device (smartphone 100) by the short-range wireless communication unit 209 has been established, and the connection unit 208 is not operating.

In step S501, the control unit 201 determines whether or not a request for starting the connection unit 208 (starting request) has been received from the smartphone 100 through the short-range wireless communication unit 209. The control unit 201 executes step S502 if it is determined that the starting request has been received, and executes periodically, for example, step S501 if not.

In step S502, the control unit 201 starts the connection unit 208 and executes the simplified AP function. Accordingly, the connection unit 208 generates a network that the connection unit 108 can connect to.

In step S503, the control unit 201 transmits information (connection information) needed for connecting to the network generated by the connection unit 208 to the smartphone 100 through the short-range wireless communication unit 209.

In step S504, the control unit 201 determines whether or not a connection request has been received from the smartphone 100 (connection unit 108) through the connection unit 208. The control unit 201 executes step S505 if it is determined that a connection request has been received, and executes periodically, for example, step S504 if not.

In step S505, the control unit 201 executes authentication processing with respect to the transmission source of the connection request (smartphone 100). Here, it is assumed that the password (encryption key) included in the connection information transmitted to the smartphone 100 is confirmed, and the authentication of the smartphone 100 succeeds. Note that the method of authentication processing and the processing when the authentication fails may differ depending of the communication standard.

Upon succeeding the authentication, the wireless connection conforming to the wireless LAN standard is established between the connection units 108 and 208, and higher speed communication becomes possible, the communication speed thereof being higher than that of communication between the short-range wireless communication units 112 and 209 conforming to the BLE. Communication of a large amount of data, such as image data transfer from the digital camera 200 to the smartphone 100, may be executed by wireless communication using the connection units 108 and 208. Also, upon receiving a simplified AP extended period from the smartphone 100 through the connection unit 208, the control unit 201 stores the simplified AP extended period in the nonvolatile memory 203, for example.

In step S506, the control unit 201 determines whether or not a disconnection request has been received from the smartphone 100 (connection unit 108) through the connection unit 208. The control unit 201 executes step S509 if it is determined that a disconnection request has been received, and executes periodically for example, step S507 if not.

In step S507, the control unit 201 determines whether or not the wireless connection of the connection unit 208 is disconnected. This is a determination as to whether or not the wireless connection has been disconnected not through a normal procedure, such as degradation in communication state. The control unit 201 executes step S508 if it is determined that the wireless connection has been disconnected, and executes step S506 if not.

For example, when the wireless connection has been disconnected due to degradation in communication state, the control unit 101 of the smartphone 100 sends a notification that the connection has been disconnected to the display unit 106. This notification can include a software button for instructing reconnection. Then, upon detecting a button operation for instructing reconnection, the control unit 101 can transmit a connection request from the connection unit 108 using connection information stored in the nonvolatile memory 103.

In step S508, the control unit 201 wait until a predetermined time has elapsed, while maintaining the operation of the connection unit 208. The control unit 201 executes step S505 if a connection request has been received before the predetermined time elapses. The control unit 201 executes step S511 to cause the connection unit 208 to end operation if a connection request has not been received before the predetermined time elapses.

The predetermined time for which the operation of the connection unit 208 is maintained in step S508 can be determined, in advance, to about several tens' seconds to one minute, for example, such that reconnection can be quickly made when reconnection is immediately instructed in the smartphone 100 while suppressing unnecessary power consumption. This predetermined time can be stored in the nonvolatile memory 203, for example.

When the wireless connection of the connection unit 208 has been disconnected not through a normal procedure as described above, the control unit 201 maintains the operating state for a certain period of time instead of causing the connection unit 208 to immediately stop operating. Accordingly, when the connection is unintentionally disconnected due to degradation in communication state or the like, the connection can be restored in a short period of time without making a request for again starting the connection unit 208.

In step S509, the control unit 201 refers to the nonvolatile memory 103, and determines whether or not the simplified AP extended period set from the smartphone 100 is not 0 (larger than 0). The control unit 201 executes step S510 if it is determined that the simplified AP extended period is not 0. On the other hand, the control unit 201 executes step S511 to cause the connection unit 208 to stop operating if it is determined that the simplified AP extended period is 0.

In step S510, the control unit 201 waits until the simplified AP extended period elapses while maintaining the operation of the connection unit 208. The control unit 201 executes step S505 if a connection request has been received before the simplified AP extended period elapses. The control unit 201 executes step S511 to cause the connection unit 208 to end operation if a connection request has not been received before the simplified AP extended period elapses.

In the present embodiment, when the wireless connection is disconnected caused by the change in state of an application that uses wireless communication from an active state, the control unit 101 determines the simplified AP extended period according to the cause of the state change, and transmits the determined simplified AP extended period to the partner device (digital camera 200). However, a configuration may also be such that when the control unit 201 of the digital camera 200 has received a request to disconnect wireless connection through the connection unit 208, the control unit 201 waits for a certain period of time, and then causes the connection unit 208 to end operation.

Also, when power is supplied to the digital camera 200 from the outside (e.g., when power is supplied from a commercial power supply), even if a request to disconnect wireless connection has been received through the connection unit 208, the connection unit 208 may continue operating.

As described above, in a communication device including two communication units that differ in communication speed, the communication device is configured to, when a connection between a communication unit that can perform high-speed communication and an external device is disconnected, request the external device to maintain a state in which the communication unit that can perform high-speed communication is connectable for a predetermined time, according to the reason of disconnection. For example, when the reason of disconnection is not an explicit operation to quit an application that uses high-speed communication, the external device is requested to maintain a state in which the communication unit that can perform high-speed communication is connectable for a predetermined time. Accordingly, the time needed for reconnection when an application temporarily leaves an active state, for example, can be reduced.

Other Embodiments

Various embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-149542, filed on Sep. 20, 2022, which is hereby incorporated by reference herein in its/their entirety.

What is claimed is:

1. A communication device comprising:
a first communication circuit;
a second communication circuit that is able to perform higher speed communication than the first communication circuit; and
one or more processors that execute a program stored in a memory and thereby function as a control unit configured to control operations of the first communication circuit and the second communication circuit,
wherein, in order to make the second communication circuit connectable to an external device, communication with the external device using the first communication circuit is needed,
the control unit, when disconnecting a connection established between the second communication circuit and the external device, requests the external device to maintain, for a predetermined time, a state in which the second communication circuit is connectable, according to a reason of disconnecting the connection, and
the control unit requests the external device to maintain, for a predetermined time, a state in which the second communication circuit is connectable, if the reason of disconnecting the connection is that an application that uses communication with the external device by the second communication circuit has transitioned from an active state not by an explicit quit operation.

2. The communication device according to claim 1, wherein the control unit requests the external device to maintain, for a predetermined time, a state in which the second communication circuit is connectable, if the reason of disconnecting the connection is an operation that causes an application that uses communication with the external device by the second communication circuit to transition from a foreground to a background.

3. The communication device according to claim 1, wherein the control unit does not request the external device to maintain, for a predetermined time, a state in which the second communication circuit is connectable, if the reason of disconnecting the connection is an explicit quit operation of an application that uses communication with the external device by the second communication circuit.

4. The communication device according to claim 1, wherein after disconnecting the connection between the second communication circuit and the external device, when communication with the external device by the second communication circuit is required, the control unit transmits a connection request to the external device from the second communication circuit without performing communication with the external device by the first communication circuit.

5. The communication device according to claim 4, wherein, if a connection between the second communication circuit and the external device is not established by the connection request, the control unit transmits a predetermined request from the first communication circuit to the external device.

6. A communication system comprising:
a first communication device and a second communication device, wherein:
the first communication device comprising:
a first communication circuit;
a second communication circuit that is able to perform higher speed communication than the first communication circuit; and
one or more processors that execute a program stored in a memory and thereby function as a control unit configured to control operations of the first communication circuit and the second communication circuit,
wherein, in order to make the second communication circuit connectable to the second communication device, communication with the second communication device using the first communication circuit is needed, and the control unit, when disconnecting a connection established between the second communication circuit and the second communication device, requests the second communication device to maintain, for a predetermined time, a state in which the second communication circuit is connectable, according to a reason of disconnecting the connection, and the second communication device comprising:

a third communication circuit;

a fourth communication circuit that is able to perform higher speed communication than the third communication circuit; and one or more processors that execute a program stored in a memory and thereby function as: a control unit configured to control operations of the third communication circuit and the fourth communication circuit, wherein the control unit upon receiving a request from the first communication device through the third communication circuit, causes the fourth communication circuit to operate, and upon receiving a disconnection request of a connection between the fourth communication circuit and the first communication device from the first communication device through the fourth communication circuit, after maintaining the operation of the fourth communication circuit for a first predetermined time, causes the fourth communication circuit to end operation.

7. A communication method to be executed by a communication device including:

a first communication circuit; and a second communication circuit that is able to perform higher speed communication than the first communication circuit, communication with the external device using the first communication circuit being needed in order to make the second communication circuit connectable to an external device, the communication method comprising:

requesting, when disconnecting a connection established between the second communication circuit and the external device, the external device to maintain a state in which the second communication circuit is connectable for a predetermined time, according to a reason of disconnecting the connection; and requesting the external device to maintain, for a predetermined time, a state in which the second communication circuit is connectable, if the reason of disconnecting the connection is that an application that uses communication with the external device by the second communication circuit has transitioned from an active state not by an explicit quit operation.

8. A non-transitory computer-readable medium that stores a program which, when executed by a computer of a communication device that includes a first communication circuit and a second communication circuit that is able to perform higher speed communication than the first communication circuit, wherein communication with the external device using the first communication circuit being needed in order to make the second communication circuit connectable to an external device, causes the computer to perform a communication method comprising:

requesting, when disconnecting a connection established between the second communication circuit and the external device, the external device to maintain a state in which the second communication circuit is connectable for a predetermined time, according to a reason of disconnecting the connection; and requesting the external device to maintain, for a predetermined time, a state in which the second communication circuit is connectable, if the reason of disconnecting the connection is that an application that uses communication with the external device by the second communication circuit has transitioned from an active state not by an explicit quit operation.

* * * * *